(12) United States Patent
Perry

(10) Patent No.: US 7,240,576 B1
(45) Date of Patent: Jul. 10, 2007

(54) CORROSION RESISTANT WELDABLE BOSSES

(75) Inventor: Thomas A. Perry, Bruce Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/330,763

(22) Filed: Jan. 12, 2006

(51) Int. Cl.
*G01D 21/00* (2006.01)

(52) U.S. Cl. .................................... 73/866.5
(58) Field of Classification Search ............... 73/866.5
See application file for complete search history.

(56) References Cited

U.S. PATENT DOCUMENTS

| | | | |
|---|---|---|---|
| 4,630,480 A * | 12/1986 | Betterton et al. ............. 73/431 |
| 5,537,032 A * | 7/1996 | Hurrell et al. ............... 324/173 |
| 5,543,672 A * | 8/1996 | Nishitani et al. .............. 310/77 |
| 5,996,408 A | 12/1999 | TenBrink et al. ............. 73/493 |
| 6,238,316 B1 | 5/2001 | Strum ........................ 475/150 |
| 6,469,500 B1 * | 10/2002 | Schmitz et al. ......... 324/207.16 |
| 6,871,487 B2 * | 3/2005 | Kurtz et al. ............. 60/39.281 |
| 2002/0021199 A1 * | 2/2002 | Serino et al. ............. 336/84 M |
| 2003/0033874 A1 | 2/2003 | Handa et al. .................. 73/494 |

* cited by examiner

*Primary Examiner*—Robert Raevis
(74) *Attorney, Agent, or Firm*—Kathryn A. Marra

(57) ABSTRACT

A corrosion resistant weldable boss includes a body portion having a lower portion formed of a sintered powder, e.g., ferrous powder, which is readily welded to a vehicle structure surface. A capping member is sintered to an upper portion of the body portion and is formed of a corrosion resistant material such as sintered stainless steel powder. Also disclosed herein are processes for inhibiting corrosion of a sensor operating in a corrosive environment about a vehicle.

22 Claims, 4 Drawing Sheets

CORROSION RESISTANT WELDABLE BOSSES

BACKGROUND

The present disclosure generally relates to corrosion resistant bosses for use in the automotive industry, and more particularly, to corrosion resistant bosses welded to a vehicle structural surface and exposed to a corrosive environment during operation of the automobile.

In general, bosses, e.g., sensor bosses, are attached to various structural surfaces within a vehicle. One ongoing problem with bosses is that they are continually exposed to a corrosive environment during the operating lifetime of the vehicle and eventually corrode, which can lead to failure. In addition to the corrosion issues, bosses are oftentimes welded in place, which requires care in the selection of the materials used to manufacture the boss and provide an effective weld. In the past, mild steel has been employed, which has been found to present the corrosion issues noted above. Stainless steel, although known for its corrosive inhibiting properties, has not been used due to well-known welding incompatibility issues.

Like bosses, sensors are also attached to vehicle structural surfaces to sense various vehicle parameters such as wheel speed, vehicle height, crankshaft and/or camshaft position, valve position, wheel position of four wheel steer vehicles, and the like. For example, sensors can be attached to axles, framing members, various engine components and the like. Precision machining of the sensor boss, prior to installation of the sensor, allows for the sensor to be installed with very tight tolerances with respect to the position about the part to be sensed, e.g., a tone wheel. Some of these sensors are exposed to the external environment during use of the vehicle resulting in corrosion. Corrosion of the sensor boss can physically perturb the sensor position, increasing the air gap between the sensor and the component being sensed resulting in measurement errors.

Accordingly, there is a need for corrosion resistant bosses that can be welded in place for use in the automotive vehicle, wherein the boss is exposed to the external environment in which the vehicle is operated. Desirably, the boss can be used with vehicle sensors.

BRIEF SUMMARY

Disclosed herein are sensor boss assemblies and processes for inhibiting corrosion of the critical surface of the sensor boss. In one embodiment, a corrosion resistant sensor boss assembly for a vehicle comprises a boss comprising a body portion formed of a sintered powder, wherein the body portion has a bottom end welded to a structural surface of the vehicle in a location that provides a corrosive environment, wherein the top end is bonded to a capping member using powder metallurgy techniques, the capping member formed of a non-corrosive material and comprising a first aperture; and a sensor disposed within the boss having one end in operative communication with a vehicle component to be sensed.

A process for inhibiting corrosion of a sensor operating in a corrosive environment about a vehicle comprises sintering a ferrous powder to form a boss adapted to receive a sensor, wherein the boss has a bottom end and a top end; affixing a capping member to the top end with a sintering process, the capping member comprising an aperture adapted to receive the sensor and position the sensor at a predetermined distance from a vehicle component to be sensed; welding the bottom end of the boss to a vehicle structural surface and securing the sensor to the capping member.

In another embodiment, a corrosion resistant boss welded to a vehicle structural surface is disclosed. The boss is adapted to house a vehicle component and comprises a body portion having a lower portion formed of a sintered ferrous powder, wherein the lower portion is welded to the vehicle structural surface; and a capping member attached to an upper portion of the body portion, the capping member formed of a sintered stainless steel powder.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
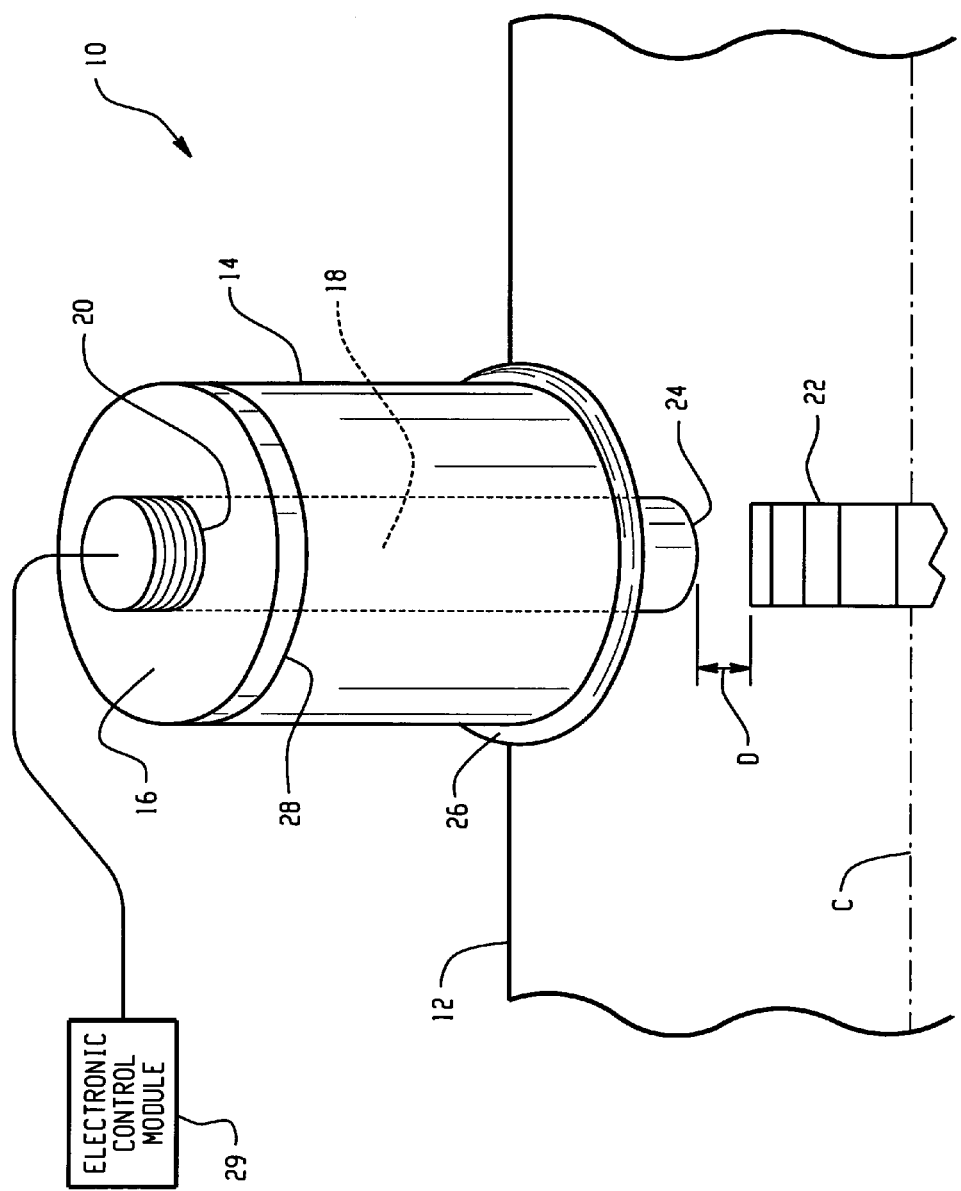
FIG. 1 illustrates a partial perspective view of a boss assembly welded to an axle including a non-contact magnetic vehicle speed sensor in accordance with one embodiment.
Figure 2:
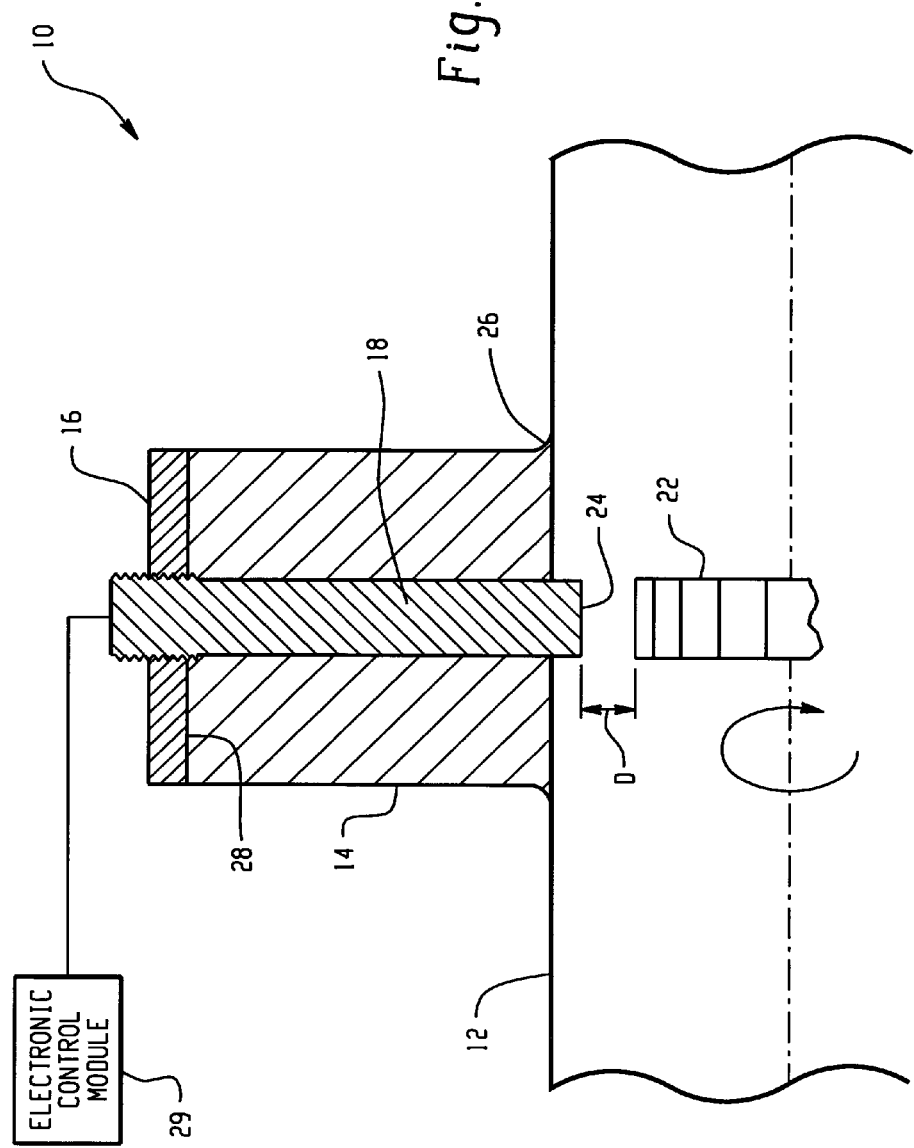
FIG. 2 illustrates a cross sectional view of the boss assembly of FIG. 1.

Referring now to FIGS. 1 and 2, there is shown an exemplary corrosion resistant boss assembly generally designated by reference numeral 10, which is suitable for welding to a vehicle structural surface 12. The boss assembly 10 includes a body portion 14 formed of a sintered powder that can be easily welded to the vehicle structure surface 12, and a capping member 16 formed of non-corrosive material. The capping member can be formed of the same or a different material then the body portion. In one embodiment of a corrosion resistant boss for housing a sensor, the capping member is formed of a corrosion resistant material such as stainless steel, which is fixedly attached to the body portion. Applicants have discovered that forming the body portion with a sintered powder using powder metallurgy technology, the boss can be readily welded to the vehicle surface, and the capping member formed of a non-corrosive material mitigates corrosion and maintains required dimensional stability required for proper sensor operation. Further, it has been discovered that that capping member can be fixedly attached to the body portion during the sintering process, i.e., a metallurgical bond can be formed between the body portion 14 and the capping member 16. In this manner, a sensor can be protected from the corrosive environment and fixedly positioned within the boss to provide a stable environment leading to robust sensor performance during the operating lifetime of the vehicle.

Although reference has been made to sensors, the illustrated boss 10 is adapted for housing any vehicle component exposed to a corrosive environment during the operating lifetime of the vehicle and is not intended to be limited to the illustrated shape shown. Advantageously, the body portion 14 and capping member 16 of the boss 10 provides corrosion resistance to a vehicle component therein. Moreover, the composition of the boss 10, as will be discussed in greater detail below, provides the boss the capability to be readily welded to structural materials commonly used for the vehicle structural surface 12. For convenience and ease in understanding, reference will be made to a boss for housing a non-contact magnetic sensor.

In general, non-contact magnetic sensors are normally attached to various structural surfaces about the vehicle to sense various vehicle parameters such as wheel speed, vehicle height, crankshaft and/or camshaft position, valve position, wheel position of four wheel drive vehicles, and the like. For example, non-contact magnetic sensors can be attached to axles, framing members, various engine components, and the like. Some of these sensors are exposed to the external environment during the operating lifetime of the vehicle resulting in corrosion, thereby damaging the sensor. Corrosion can physically perturb the sensor position increasing the air gap between the sensor and the component being sensed, which can result in measurement errors. Moreover, for those sensors that are actually housed in a housing of some type, the sensors are still prone to the effects of corrosion since these housings are typically fabricated from the same materials as those used for the vehicle structural surface, e.g., mild steels. Those prior art housings that do employ a different material composition are oftentimes difficult to weld and even those that are successfully welded are prone to later failure at the point of the weld. The bosses of the present disclosure overcome these problems as will be discussed in greater detail below.

Exemplary non-contact magnetic sensors that are exposed to a corrosive environment during the operating lifetime of the vehicle are vehicle speed sensors. However, it should be noted that the present disclosure is not intended to be limited to the particular configuration of sensor boss shown nor is the disclosure intended to be limited to the particular type of sensor shown. Other suitable sensors include, but are not limited to, crankshaft position sensors, load sensors, camshaft position sensors, variable valve position sensors, ride height position sensors, Hall effect type sensors, Reed relay switch type sensors, induction-based sensor, magnetoresistors, flux gates, and the like.

One type of vehicle speed sensor is a pick-up coil type sensor. This type of sensor consists of a permanent magnet and a coil disposed about a core housed within a body portion. The sensor is generally mounted in close proximity to a toothed gear, e.g., a rotor. As each tooth moves past the sensor, an AC voltage pulse is induced in the coil, wherein each tooth produces a pulse. As the gear rotates faster, there are more pulses. The electronic control module (ECM) determines the speed the component is revolving based on the number of pulses. Since these sensors are non-contact magnet sensors, the distance between the gear and the pick-up coil is critical. The further apart they are, the weaker the signal. Thus, an increase in air gap such as may be caused by volumetric expansion of the sensor boss due to corrosion can quickly result in a weak signal and cause frequency measurement error.

By mounting the vehicle speed sensor in the boss assembly 10, corrosion resistance is obtained thereby providing accurate readings and extended operating lifetimes. As previously discussed, the boss assembly 10 includes a body portion 14 formed of a sintered powder, e.g., ferrous powder. The shape and configuration of the body can be formed using powder metallurgy techniques. In powder metallurgy, one or more metal powders are blended with a binder, and are compacted in a closed metal cavity (the die) under pressure. It should be noted that wrought parts may also be included in the die, if desired. The part once formed is ejected from the die and is generally referred to by those in the art as a so-called "green" part. The binder helps the green part retain its shape at this stage. The green part is then placed in an oven and sintered in a controlled atmosphere at high temperatures such that the metal powders coalesce and form a solid and the binder is burned off. A second pressing operation, i.e., repressing, can be done prior to sintering to improve the compaction and the material properties as may be desired for some applications. The sintering temperature is chosen to optimize atomic diffusion between the metal powder particles and any wrought elements included in the green part. Generally, the sintering temperature is held below the melting temperature of the powder to retain part shape. Some powders can be blended to contain high and low melting temperature powders with the low melting point component becoming liquid during the sinter process, which is also referred to by those in the art as liquid phase sintering. This can often be beneficial for some applications for enhancing the bond between powders and wrought members of a part to the formed and may be included in any embodiment of this disclosure.

Suitable powders for fabricating the boss 10 include iron, but may also include nickel, manganese, copper, phosphorus, carbon, and the like. Other suitable powders include cermets, intermetallic compounds, metal matrix composites, nanostructured materials, high-speed steels, and the like.

The vehicle structural surface 12 is typically formed of a material such as mild steel, for example. The term 'mild steel' generally refers to alloys of iron and carbon having carbon content up to about 0.25%. Mild steels are be expected to be readily weldable and may contain additional alloying elements, e.g., manganese, silicon, phosphorous, lead, sulphur, and the like. Because of this, in one embodiment it is preferred that powders selected to form the body portion are compatible to provide an effective weld between the vehicle structural surface and the boss.

In one embodiment, the body portion is formed from a sintered ferrous powder. The capping member can be formed from a stainless steel sintered powder to shield the magnetic sensor. In another embodiment, the particular height of the sintered ferrous powder along the body portion is at a height effective to provide adequate welding of the boss onto the desired vehicle structural surface. It is well known that welding stainless steel to mild steel is problematic. In this manner, welding of the boss formed of a sintered powder such as a ferrous powder can readily occur. Moreover, by forming the capping members from wrought stainless steel or sintered stainless steel powder, the benefits of corrosion resistance associated with stainless steel can be obtained. As such, the air gap relative to the tone wheel can be maintained and the sensor 18 effectively protected from the corrosive effects on the external environment.

In the illustrated boss 10 of FIGS. 1 and 2, a capping member 16 is fixedly attached to the body portion 14, which also serves as a reference surface for a sensor 18 (or a vehicle component) disposed within the boss 10. The capping member maintains the sensor at a predetermined distance D from an underlying tone wheel 22, for example. The capping member 16 includes an aperture 20 to which one end of the sensor is attached. For example, the capping member can include a threaded portion and the sensor 18 (shown in silhouette) can include a complementary threaded portion about an exterior surface portion so as to engage the threaded aperture 20 upon attachment of the sensor to the boss 10 and maintain the sensor at the predetermined distance, i.e., the sensor 18 is at a fixed position relative to the gear teeth of the tone wheel 22, for example.

The sensor 18 itself generally includes a permanent magnet, a core extending from the permanent magnet, and a coil wound about the core. Wires are in electrical communication with the core and an electronic control module 29 external to the sensor for processing the voltage signals produced by the sensor. One end 24 of the core is fixedly positioned in close proximity to a gear tooth of a gear, e.g., the tone wheel 22. The distance D between the end 24 and the tone wheel 22 is also referred to herein as the air gap. The body portion 14 is welded to the structural surface 12 such as an axle as shown. The capping member 16 is formed of a non-corrosive material such as stainless steel. In a preferred embodiment, the capping member 16 is formed of sintered stainless steel powder. In this manner, the upper surface of the body 28 is shielded from the corrosive environment and interference from the capping member 16 is minimized and controlled. In other embodiments the capping member 16 is formed of a wrought part, coated with a powder using powder metallurgy techniques, and sintered to form a corrosion resistant surface.

It should be noted that the so formed boss is closed on both ends, wherein one end 26 of the sidewalls that define the body portion is welded to the vehicle structural surface 12 and the other end 28 of the body portion 14 includes the capping member 16. In one embodiment, attachment of the body portion 14 to the capping member 16 at end 28 is formed during the sintering process. Advantageously, attachment in this manner precludes the need to weld dissimilar materials or use other less reliable joining methods.

Figure 3:
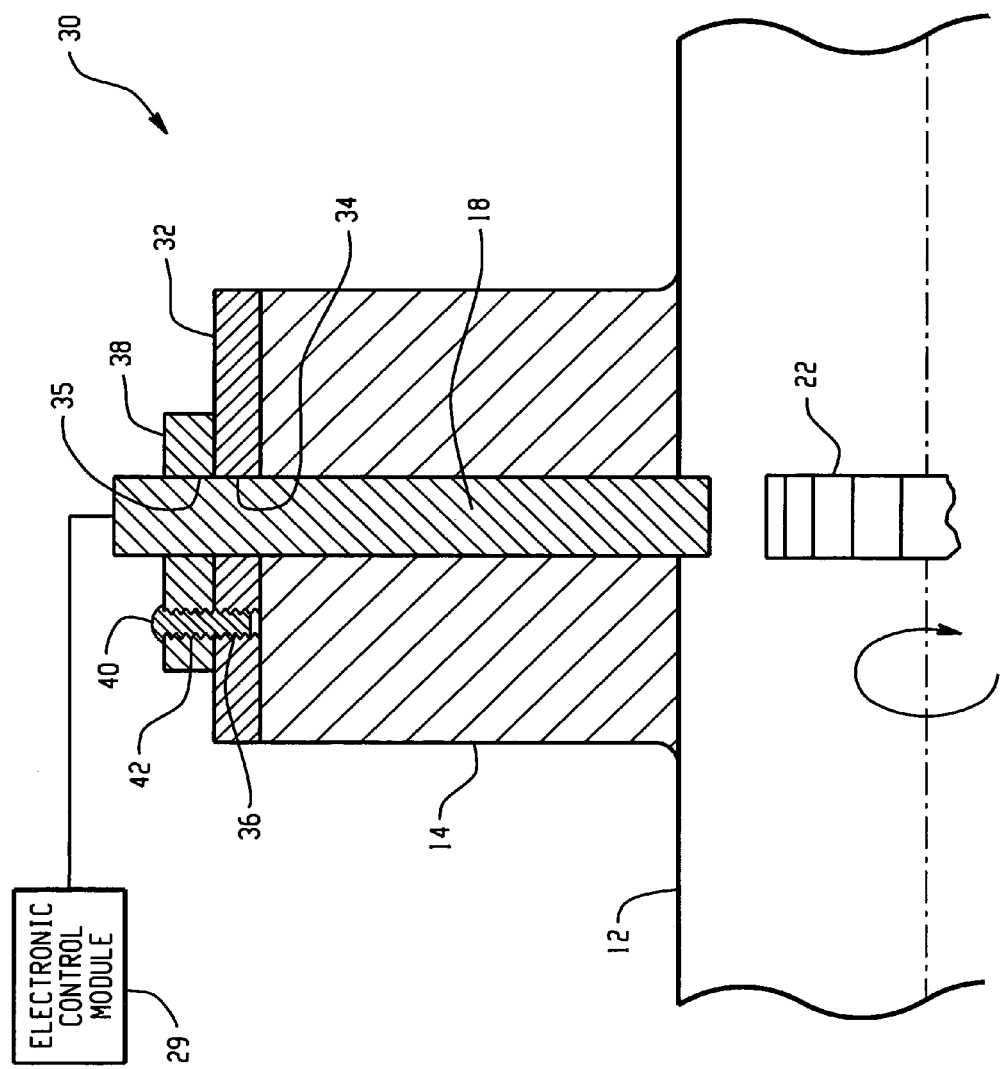
FIG. 3 illustrates a cross sectional view of a corrosion resistant boss assembly in accordance with another embodiment.

In another embodiment as shown in FIG. 3, a boss assembly 30 includes capping member 32 fixedly attached to the body portion 14. The capping member 32 includes a centrally located first aperture 34 and a second aperture 36 offset from the first aperture 34. The first aperture 34 has a diameter suitable to accommodate the outer diameter of the sensor. The second aperture is preferably threaded. The sensor 18 further includes a flange member 38 fixedly attached to the sensor 18. The flange member 38 includes a first aperture 35 coaxial to first aperture 34 of the capping member 32. The flange member 38 also includes a second aperture 42 coaxial to second aperture 36 of the capping member 32. In one embodiment, a screw 40 threadingly engages the apertures 36, 42 to secure the sensor to the capping member 32 and maintain the sensor 18 at a fixed spatial relationship to the underlying tone wheel upon securement of the capping member 32 to the boss 30. Alternatively a nut and bolt can be used to secure the sensor to the capping member and maintain the sensor 18 at the fixed spatial relationship to the underlying tone wheel. Other methods of securing the sensor to the boss are well within the skill of those in the art.

Figure 4:
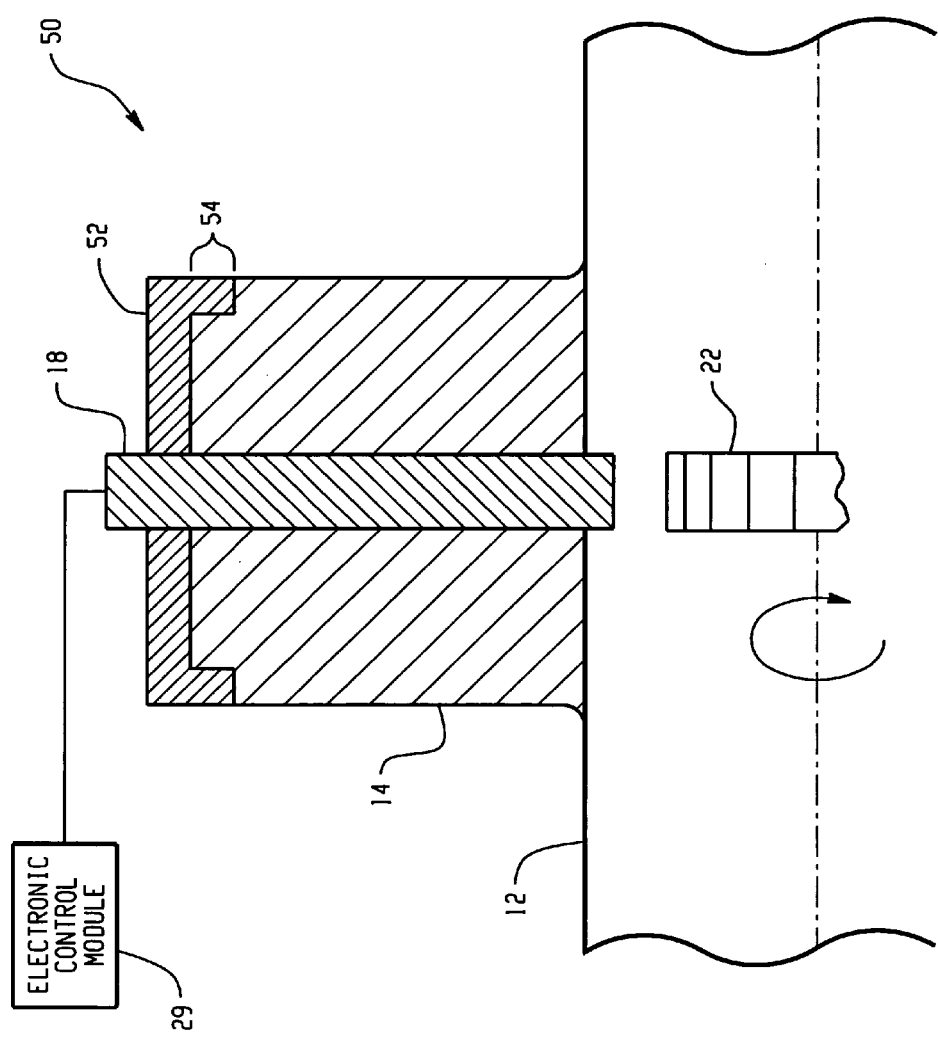
FIG. 4 illustrates a cross sectional view of a corrosion resistant boss assembly in accordance with yet another embodiment.

FIG. 4 illustrates boss assembly 50, wherein the cap member 52 in includes an annular shoulder portion 54 that forms a portion of the sidewall of the body portion 14. By forming the capping member as shown, corrosion resistance can be enhanced in corrosive environments that include exposure to moisture. Moisture attack of the sensor 18 now percolates a greater distance relative to a capping member without the shoulder portion, i.e., moisture travels from the through the metallurgical joint between the capping member and the body portion 14 to the sensor. The amount of extension to the annular shoulder portion 54 is not intended to be limited and will generally be determined by the application and environment in which the boss is disposed.

During operation, a magnetic field about the permanent magnet changes as a magnetic tone wheel 22 rotates about its central axis C and each gear tooth passes in front of the core end 24. The magnetic field change is sensed by the voltage generated in the coil of wire in the magnetic field. As is appreciated by those skilled in the art, the magnitude of the induced voltage increases as a function of the speed of the tone wheel 22 passing the sensor 18 whereas the voltage decreases as the air gap (D) increases.

As used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A corrosion resistant sensor boss assembly for a vehicle, comprising:
   a body portion formed of a sintered powder, wherein the body portion has a bottom end welded to a vehicle structural surface in a location that provides a corrosive environment, wherein the top end is bonded to a capping member using powder metallurgy techniques, the capping member formed of a non-corrosive material and having a first aperture therein; and
   a sensor disposed within the boss having one end in operative communication with a vehicle component to be sensed.

2. The corrosion resistant sensor boss assembly of claim 1, wherein the sensor comprises a permanent magnet, a core extending from the permanent magnet, and a coil wound about the core, wherein the sensor is fixedly positioned from the vehicle component to detect changes in a magnetic field.

3. The corrosion resistant sensor boss assembly of claim 1, wherein the body portion is formed of a sintered ferrous powder and the capping member is formed of a sintered stainless steel powder.

4. The corrosion resistant sensor boss assembly of claim 1, wherein the sensor comprises a vehicle speed sensor, a crankshaft position sensor, a camshaft position sensor, a variable valve position sensor, or a ride height position sensor.

5. The corrosion resistant sensor boss assembly of claim 1, wherein the sensor is a Hall effect type sensor, a Reed relay switch type sensor, an induction-based sensor, or a magnetoresistor sensor.

6. The corrosion resistant sensor boss assembly of claim 1, wherein the vehicle structural surface is formed of mild steel.

7. The corrosion resistant sensor boss assembly of claim 1, wherein the vehicle structural surface is an axle.

8. The corrosion resistant sensor boss assembly of claim 1, wherein the capping member and/or body portion is formed of a wrought corrosion resistant material coated with the sintered powder.

9. The corrosion resistant sensor boss assembly of claim 1, wherein the vehicle component is a tone wheel.

10. The corrosion resistant sensor boss assembly of claim 1, further comprising a flange member fixedly attached to the sensor, wherein the flange member includes a second aperture coaxial to a second aperture of the capping member, wherein the second apertures are adapted to receive a bolt for securing the flange to the capping member.

11. The corrosion resistant sensor boss assembly of claim 1, wherein the capping member comprises an annular shoulder portion, wherein the annular shoulder portion is metallurgically bonded to the top end by the sintering process.

12. A process for inhibiting corrosion of a sensor operating in a corrosive environment about a vehicle, comprising:
sintering a ferrous powder to form a boss adapted to receive a sensor, wherein the boss has a bottom end and a top end;
affixing a capping member to the top end by a sintering process, the capping member formed of a stainless steel having an aperture therein adapted to receive the sensor and position the sensor at a predetermined distance from a vehicle component to be sensed;
welding the bottom end of the boss to a vehicle structural surface and
securing the sensor to the capping member.

13. The process according to claim 12, wherein the vehicle structural surface is formed of a mild steel.

14. The process according to claim 12, wherein the capping member is formed of a stainless steel powder.

15. The process according to claim 12, wherein the sensor comprises wherein the sensor is a Hall effect type sensor, a Reed relay switch type sensor, an induction-based sensor, or a magnetoresistor sensor.

16. The process according to claim 12, wherein the sensor comprises a vehicle speed sensor, a crankshaft position sensor, a camshaft position sensor, a variable valve position sensor, or a ride height position sensor.

17. The process according to claim 12, wherein the boss comprises a lower portion formed of a sintered ferrous powder and an upper portion formed a sintered stainless steel powder.

18. A corrosion resistant boss welded to a vehicle structural surface, the boss adapted to house a vehicle component comprising:
a body portion having a lower portion formed of a sintered ferrous powder, wherein the lower portion is welded to the vehicle structural surface; and
a capping member sintered to an upper portion of the body portion, the capping member formed of a sintered stainless steel powder.

19. The boss of claim 18, wherein the capping member and/or body portion is formed of a wrought corrosion resistant material coated with the sintered powder.

20. The boss of claim 18, wherein the capping member is adapted to receive a sensor fixedly attached thereto, wherein the sensor is housed within the body portion.

21. The boss of claim 18, wherein the body portion is formed of the sintered ferrous powder.

22. The boss of claim 18, wherein the capping member comprises an annular shoulder portion, wherein the annular shoulder portion is metallurgically bonded to the upper portion.

* * * * *